United States Patent
Grimse et al.

(10) Patent No.: US 6,269,355 B1
(45) Date of Patent: Jul. 31, 2001

(54) AUTOMATED PROCESS GUIDANCE SYSTEM AND METHOD USING KNOWLEDGE MANAGEMENT SYSTEM

(75) Inventors: Mark Grimse, San Jose; Thomas A. King, Danville; Pat Neargarder, Saratoga, all of CA (US); Michael Ohr, Karlsruhe (DE)

(73) Assignee: Kadiri, Inc., Burlingame, CA (US)

(*) Notice: Subject to any disclaimer, the term of this patent is extended or adjusted under 35 U.S.C. 154(b) by 0 days.

(21) Appl. No.: 09/292,653

(22) Filed: Apr. 15, 1999

(51) Int. Cl.[7] .......................... G06F 17/00; G06F 17/60; G06F 7/00
(52) U.S. Cl. ................ 706/46; 706/45; 705/32; 707/102
(58) Field of Search ................ 706/47, 46, 45; 705/32; 707/102

(56) References Cited

U.S. PATENT DOCUMENTS

| | | | |
|---|---|---|---|
| 5,103,498 | * 4/1992 | Lanier et al. | 706/58 |
| 5,220,500 | * 6/1993 | Baird et al. | 705/36 |
| 5,485,544 | * 1/1996 | Nonaka et al. | 706/11 |
| 5,701,400 | * 12/1997 | Almado | 706/45 |
| 5,787,234 | * 7/1998 | Molloy | 706/46 |
| 5,787,416 | * 7/1998 | Tabb et al. | 707/2 |
| 5,809,317 | * 9/1998 | Kogan et al. | 707/501 |
| 5,818,435 | * 10/1998 | Kozuka et al. | 345/302 |
| 5,933,140 | * 8/1999 | Strahorn et al. | 345/338 |
| 6,081,786 | * 7/2000 | Barry et al. | 705/3 |
| 6,101,488 | * 8/2000 | Hayashi et al. | 706/45 |

OTHER PUBLICATIONS

Zhang et al, "Multimedia Courseware over the Internet", IEEE Candain, Conference on Electrical and Computing Engineering, May 1998.*

Rosis et al, "Adaptive Interaction with Knowledge–Based System" ACM Proceedings of the Workshop on Advance Visual Interfaces, Jun. 1994.*

Schlatter, U.R., "Real–Time Knowledge–Based Support for Air Traffic Management", IEEE Expert, Jun. 1994.*

Microsoft Press, Computer Dictionary: Third Edition 41, 239–40, 372, 479, 1997.*

ForeFront, Inc., ForeHelp: Help–Authoring System for Microsoft Windows 20–26, 99–108, 111–19, 167–71, 1994.*

* cited by examiner

Primary Examiner—George B. Davis
(74) Attorney, Agent, or Firm—Gray Cary Ware & Freidenrich LLP

(57) ABSTRACT

A system and method for guiding a user through a complex process having a plurality of steps is provided. The system permits a user with little or no knowledge of the process to complete the process. The guidance system includes a logical structure which models the process steps within the process and guidance pages which provide the user with additional information about how to proceed through the process. The guidance pages have one or more page fragments and each page fragment is dynamically generated based on certain preconditions so that the guidance pages are easily customizable.

10 Claims, 19 Drawing Sheets

PROCESS GUIDANCE SYSTEM

FAMILY MEDICAL LEAVE ACT

550

ATTENDANCE MANAGEMENT

ACTION PLAN

From "AP" arrows in Investigate Task

552

| The Disposition at present is: [Show current disposition]. Do you want to override this? (Select "Guidance" to evaluate plan.) | {AMG 0064} |

554 — Yes      No — 556

| Describe how you want to disposition this case: [Text Box] | {AMG 0065} |

| Select "Continue" to review Disposition Report, and then SAVE it locally on your machine. |

{AMG 0066}

558

| If you have more flagged employees to handle, start again at the Manager's Desktop. |

[ Status ]  [ Continue ]

FIGURE 11

600 → ATTENDANCE MANAGEMENT
Examples of Disposition Reports
[Separate report for each flagged employee]

Disposition Report
10/14/97

| nployee | # | Org | Absence | Disposition |
|---|---|---|---|---|
| ane Doe | 2-55456 | 7-234 | 240 hrs YTD<br>160 hrs PTD | Not a problem |

} 602

Disposition Report
10/14/97 red Klutz  1-33900  7-223  45 hrs YTD  Not my employee
                            40 hrs PTD

} 604

Disposition Report
10/14/97

John Smith  1-23678  7-234  50 hrs YTD  Primarily excused absence
                             12 hrs PTD  Proper notice
                                         Proper certification
                                         Absence will continue
                                         Not a singular event
                                         Familiar with Attendance Policy
                                         Not a probationary employee
                                         No prior action
                                         No Disability
                                         Business impact: "Morale of group is affected, customers dissatisfied."
                                         Action Plan: Informal Counseling
                                         Override: "I do not plan to take any action."

COMPENSATION PLANNING - ENG. SALARY FOR 1999

File   Edit   Tools   Windows   Help

| 1. Rate Employees | 2. Plan Employee Salary | 3. Plan Employee Bonus | 4. Plan Employee Stock | 5. Review & Adjust |

Enter employee's new performance rating:

| | Employee | Prev. Perf. Rating | New Perf. Rating |
|---|---|---|---|
| ! | Jones, E. | Excellent | Excellent |
|   | Martines, J. | Excellent | Exceeds |
|   | Lee, B. | Excellent | Exceeds |
| ! | Dubois, G. | Exceeds | Exceeds |
|   | Cray, O. | Exceeds | Exceeds |
|   | Amato, J. | Exceeds | Exceeds |
|   | Prakash, G. | Exceeds | Meets |
|   | Johnson, A. | Meets | Meets |

Supporting Data and Analytics

Perf. Rating Distribution
Employee Detail
Group Comparison
Range Pos. by Perf. Rating Current Distribution ◇ Excellent: 10%
◇ Exceeds: 50%
◇ Meets: 30%
◇ Below: 10%
◆ Unacceptable: 0%

Recommended Distribution

◇ Excellent: 10%
◇ Exceeds: 25%
◇ Meets: 45%
◇ Below: 17%
◆ Unacceptable: 3%

Currency: $(US) ▼  View Budget: Merit ▼  Total: 30,720.00  Allocated: 43,375.00  Remaining: -12,655.00

FIGURE 15

COMPENSATION PLANNING - KEY TALENT BONUS FOR 1999

File   Edit   Tools   Windows   Help

1. Rate Employees | 2. Plan Employee Salary | 3. Plan Employee Bonus | 4. Plan Employee Stock | 5. Review & Adjust Jones, E. ▼ [Prev] [Next]

Enter employee's target bonus payout as a percent of base salary:

| Target % | Salary | Target$ |
|---|---|---|
| 25% | $50,000.00 | 12,500.00 |

Sensitivity Analysis
Payout based on the following assumptions:

| | Weight | Assumption | | Bonus $ |
|---|---|---|---|---|
| Individual Performance | 30% | Meets ▼ | | $3,750.00 |
| Company Performance | 70% | 100% ▼ | | $8,750.00 |
| Total | 100% | | | $12,500.00 |

Exceptions:
! Bonus exceeds guidelines

Notes: 🗅

Supporting Data and Analytics - Jones, E.

[Bar chart with scale 40000–100000]
■ Job Max
⊞ Job Min
□ Bonus
■ Current Salary

[Bonus ▼]

Suggested Target Bonus

| Grade | Suggested Target |
|---|---|
| 9 | 15-25% |
| 8 | 10-15% |
| 7 | 10-20% |
| 6 | 5-15% |
| 5 | 5-15% |

[Employee Detail] [Group Comparison]

Currency: $(US)   View Budget [Bonus ▼]   Total: 30,720.00   Allocated: 43,375.00   Remaining: -12,655.00

COMPENSATION PLANNING - EMPLOYEE STOCK FOR 1999 — 690

File  Edit  Tools  Windows  Help

1. Rate Employees | 2. Plan Employee Salary | 3. Plan Employee Bonus | 4. Plan Employee Stock | 5. Review & Adjust

Jones, E. ▼   ◄ Prev / Next ► — 678

Enter employee's stock grant:

| Number of Shares | Recent Price | Grant Value |
|---|---|---|
| 850 | $12 | $10,200.00 |

Exceptions: — 679
! Grant exceeds guidelines

Notes: 🗋

— 672

Supporting Data and Analytics - Jones, E.

Chart (y-axis: 40000–100000)
■ Current Salary
□ Stock Grant
[Stock ▼]

Suggested Stock Grant

| Grade | Suggested Number of Shares |
|---|---|
| 9 | 800-900 |
| 8 | 700-800 |
| 7 | 600-700 |
| 6 | 500-600 |
| 5 | 400-500 |

Employee Detail
Group Comparison

— 674

View Budget: [Stock ▼]   Total: 5,000   Allocated: 5,500   Remaining: -500

Units: Shares

— 676

GUIDANCE FOR STACK RANKING OPTION

"Stack ranking" is defined as a 1 - n ranking of employees based on their performance against their job description. It is not meant to be a ranking of their value to the company (that kind of ranking is sometimes called a "reverse layoff" list). Thus a junior engineer could be ranked higher than a senior engineer simply by virtue of doing his/her job better. Junior level employees who are ranked very high in their grade are often candidates for promotion to the next level in that job family (i.e., it is time to make their job more difficult). This usually results in them having a lower stack ranking and a lower performance rating in the next planning session.

If you have employees in different salary ranges or grades, then you can first do the ranking within each grade. Then in order to merge the ranking into one overall list for your group, use the technique illustrated by this example:

| E10 Employees: | E09 Employees: | E08 Employees: |
|---|---|---|
| 1. Karen Feiding | 1. Sam Spade | 1. Fannie Farmer |
| 2. Fred Klutz | 2. George Gap | 2. Jim Keiper |
| 3. Joe Smith | 3. Susie Emblem | 3. Allan Jones |
| 4. Irving Fazola | 4. Roberto Cruz | 4. Anna Storm |
| 5. Jane Doe | | 5. Evan White |
| | | 6. Bill Baker |
| | | 7. Lavon Larue |

To start the merge process on these lists, you choose which employee is the number one overall employee in how well they do their job. Obviously, the only candidates for this honor are the three employees who rank at the top of their respective grade ranking. In this case, the candidates for #1 overall are Karen Feiding, Sam Spade, and Fannie Farmer. So let's say you pick Fannie Farmer as the best at their job of those three. That puts Fannie on top of the overall stack ranking list. Then you pick the employee who ranks second overall. The candidates are Karen, Sam, and Jim Keiper because Fannie is already placed. Continue in this manner until you have a total merged list from 1 - n.

Active Advice
FOR TOTAL COMPENSATION

Alerts for Evelyn Jones:

☑ Merit Increase Over Increase Matrix Guidelines
☑ Above Market Range
☑ Above Range Position

Alerts for Evelyn Jones:

Merit Increase Over Increase Matrix Guidelines

The planned Merit Increase for this Employee is over the Increase Matrix guidelines. Please review the suggested percent increase range in the appropriate cell of the Increase Matrix.

There may be good reasons to go over the Increase Matrix guideline. For example:

- The Employee may be overdue for an increase (prorating);
- You may be correcting an internal or external inequity;
- The Employee may be at the high end of the performance category and you are compensating for the difference elsewhere in your plan (e.g. with another Employee's lower increase);
- You may be moving a top performer aggressively to a more Frequently Asked Questions Reference Center Return to Application

DECISIS

AUTOMATED PROCESS GUIDANCE SYSTEM AND METHOD USING KNOWLEDGE MANAGEMENT SYSTEM

BACKGROUND OF THE INVENTION

This invention relates generally to a system and method for automatically guiding a user through a complex process including process steps where each step may have multiple selectable options or require a user to take actions based upon knowledge of detailed process rules or policies underlying the process.

Some processes performed by humans may involve a sequence of well defined steps which depend upon the person having a detailed knowledge of process rules, relationships, process policies and process procedures. To a person who is intimately aware of the process and understands its steps and policies by having performed the process numerous times, the sequence of steps may be easy to follow. For example, a seasoned line manager who has re-tooled a production line hundreds of times and who must now re-tool a production line for a different product can do so quite easily since the steps and parameters involved in the re-tooling process are well known to the line manager. The problem, however, is that the same process may seem very complex and daunting to a person who has very infrequent contact with the process. For example, a person who is re-tooling a production line for the first time may find the re-tooling process very complex, confusing, and time-consuming, and may require frequent assistance from a person having more experience with the process.

Similarly, in the area of human resources there are a number of processes which may be easy to perform for the seasoned human resources professional who has followed the process steps numerous times. These processes, may, however, appear quite complex and confusing to another who has not had much experience with executing the steps of the process. For example, an interview process, a process for handling an escalating discipline problem, a process for determining employee compensation, a process for handling an attendance problem, a process for handling a work absence request, or a process for coaching better performance for an employee are typical processes which supervisors and managers of people are required to perform. They are all processes which may be easy to perform for an experienced human resources professional. However, they may be very difficult for a line manager who has very little human resources experience and who has very little experience with the above processes. A person, such as a line manager, who only occasionally encounters such processes and may not fully understand the process steps, legal pitfalls, or the company's rules or policies upon which the decisions should be made, may be forced to involve another person who does understand the process. This is inefficient since two people are now involved in the process.

In the past, when a line manager had to go through a particular process, such as a progressive discipline process for an employee, the line manager would typically be required to read a large manual which would explain the policy of the company relating to discipline and then the process for handling the discipline problem. Invariably, either because the manual was not clear, the manual was too cumbersome to read, or the line manager had not had sufficient experience with the particular process, the line manager would contact the human resources department for assistance and guidance through the process. Even after an initial explanation, the line manager may often call the human resources department for clarification during the process.

Some businesses attempt to train their managers in their human resources processes to reduce the amount of time that the human resources department is involved in each process. This "just-in-case" training is very expensive and time-consuming. In addition, a manager typically forgets most of the training after a short time because it is not seen as directly applicable to the manager's job or the manager does not frequently perform any of these processes. Then, when the manager does need to perform the process, refamiliarization is necessary. For example, the manager will typically have no idea how to initiate the process which involves some basic fact gathering necessary to determine the next step to be taken. For example, in the case of a discipline problem, the particular employee's past discipline problems are critical since any disciplinary action may depend, in part, on the past discipline.

In addition to the human resources type of processes described above, there are a large number of other types of processes in general which are easy to perform for a person who frequently executes the steps of the process, but may be very difficult for a person who has little or no experience with the particular process, its steps or its policies. It is desirable, however, to provide an inexperienced person with an automated system which guides him through a process with appropriate tools which minimize outside help, so that the person is able to perform the process efficiently. It is to this end that the present invention is directed.

SUMMARY OF THE INVENTION

The invention provides a system for guiding a user through a complex process in which the system may automate some predetermined portion of the process and make appropriate support tools available to permit an understanding of underlying rules, requirements, standards or policies which are necessary to the process steps. For example, in the context of a human resources process, such as disciplining an employee, the system may guide a manager through the discipline process so that the manager requires minimal contact with, for example the human resources department, until the human resources department may be required to step into the process. To guide the user through the process, a logical structure is generated which organizes the process into a logical construct of process steps. In particular, each node of the logical construct may represent a process step or a decision point. The system then guides the user through the process steps using the logical construct. The logical construct may have the form of a decision tree, a decision matrix, a sequence of actions, or an iterative process.

The logical construct of the guidance system may associate with the nodes of the logical construct one or more guidance pages which permit the user of the guidance system to select the guidance page and receive advice about this specific point in the process, its underlying rules, standards or policies, and/or a definition of a particular term in the process. Thus, the guidance pages help to answer the user's specific questions and facilitate the user's decisions at each point in the process. The guidance pages may also recommend a course of action (based on policy, prior data entered by the user, legal interpretations, etc.) to the user of the system at a particular point in the process. For example, in a compensation system where the user wants to increase the compensation for an employee beyond the job's maximum salary level, a guidance page may recommend that the user either promote the employee to a higher level to increase the salary, or provide other compensation alternatives such as increasing the employee's stock options, or explain the salary problem to the employee in a specific way.

In the case of an explanation, another guidance page may provide the user with a script to follow during his explanation to the employee of the salary problem.

The guidance pages in accordance with the invention may be comprised of one or more page fragments. Each page fragment may include a fragment precondition so that the page fragment is displayed to the user of the system only if the precondition is met. For example, a page fragment indicating that a union representative should be present at a counseling session is only shown to the user if the employee in question is part of a union. Thus, the actual guidance pages shown to a user may dynamically change based on the page fragments and their fragment preconditions. Thus, the guidance pages may be dynamically alterable to customize the guidance system for any situation or any individual company.

Thus, in accordance with the invention, a system for guiding a user through a complex process having a plurality of steps at each of which the user is required to make a decision is provided. The system comprises a logical structure for representing the steps of the process wherein each node of the structure represents a step in the process, and one or more of the steps presents alternatives to the user requiring the user to make a decision, and one or more guidance pages may be attached to each node of the structure which provides the user of the system with guidance about how to make decision at the current step of the process. The system further gathers the user responses to each step in the process to generate process information, and recommends an action to the user based on the process information. In other words, the guidance is data-specific and situation-specific.

In accordance with another aspect of the invention, an apparatus for guiding a user through a process having a plurality of steps is provided in which a logical structure is generated for representing the steps of the process wherein each node of the structure represents a step in the process and one or more of the steps presents alternatives to the user requiring the user to make a decision. The system further comprises a database containing one or more page fragments having an associated fragment precondition which requires a condition (e.g., true/false, effective date, etc) wherein the page fragment is placed within a guidance page when the precondition is met. The system further comprises generating a guidance page for a process step based on the page fragments.

BRIEF DESCRIPTION OF THE DRAWINGS

FIG. 11 is a flowchart illustrating an action plan in accordance with the third embodiment of the invention;

FIG. 12 is a diagram illustrating several examples of a disposition report generated for several employee using the third embodiment of the invention;

FIG. 14 is a diagram illustrating a page of the compensation process showing employee ratings;

FIG. 15 is a diagram illustrating a page for planning the salary of an employee during the compensation process;

FIG. 16 is a diagram illustrating a page for planning variable pay for an employee during the compensation process;

FIG. 17 is a diagram illustrating a page for planning stock grants for an employee during the compensation process;

FIG. 19 is a diagram illustrating an example of a guidance page for the compensation process; and FIG. 20 is a diagram illustrating an example of an alert page in accordance with the invention.

DETAILED DESCRIPTION OF A PREFERRED EMBODIMENT

The invention is particularly applicable to a process guidance system and method in which a user may be automatically guided through a complex multi-step human resources process, and it is in this context that the invention will be described. It will be appreciated, however, that the guidance system and method in accordance with the invention has greater utility, such as to non-human resource types of processes and to other industries where an employee may be guided through a complex process. For example, the system may be used to guide an employee through a production line re-tooling process or to guide an employee through a complex repair process.

Figure 1:
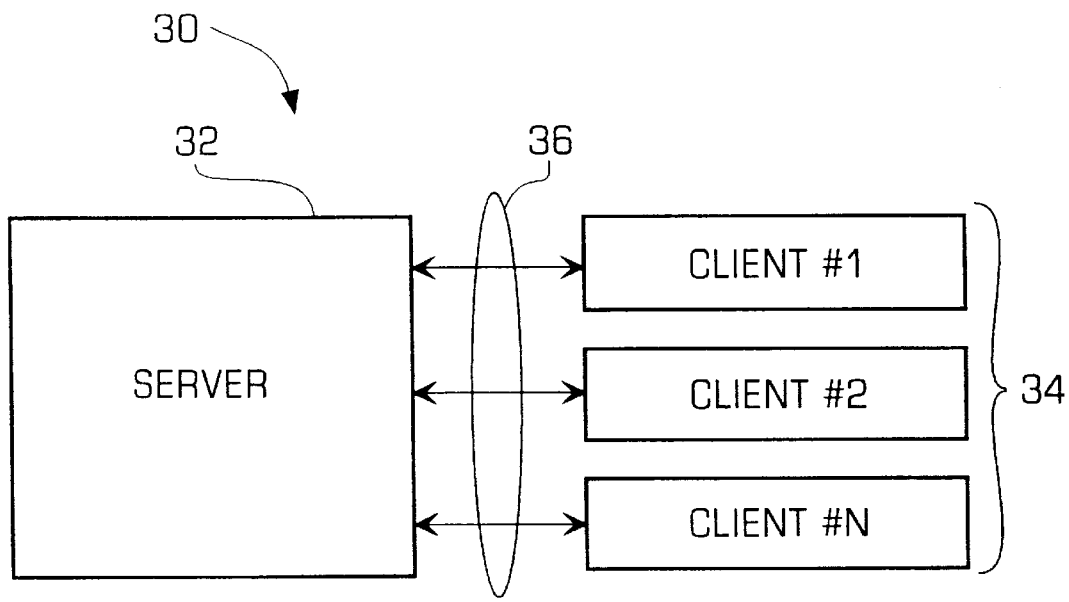
FIG. 1 is a block diagram illustrating a conventional client/server system of the type with which the invention may be employed.

FIG. 1 is a block diagram illustrating a conventional client/server computer system 30 of the type with which the invention may be used. The computer system 30 may include a central server computer 32 and one or more client computers 34 (Client#1, Client#2 and Client#N) connected together by a local or wide area computer network 36, such as an Intranet. The computer system may be a thin client system in which the server contains a majority of the software applications being executed and the client computers execute, for example, a World Wide Web (WWW) browser-based application which interacts with the software applications being executed by the server. The computer system may also be a fat client system in which the majority of the software applications are being executed by the client computers and the server computer acts as a repository of data for the client computers. In either case, objects may be exchanged between the server computer and the one or more client computers. Each client computer may independently interact with the server computer and exchange objects with the server computer. Now, a process guidance system in accordance with the invention that may be implemented within a typical client/server system will be described.

Figure 2:
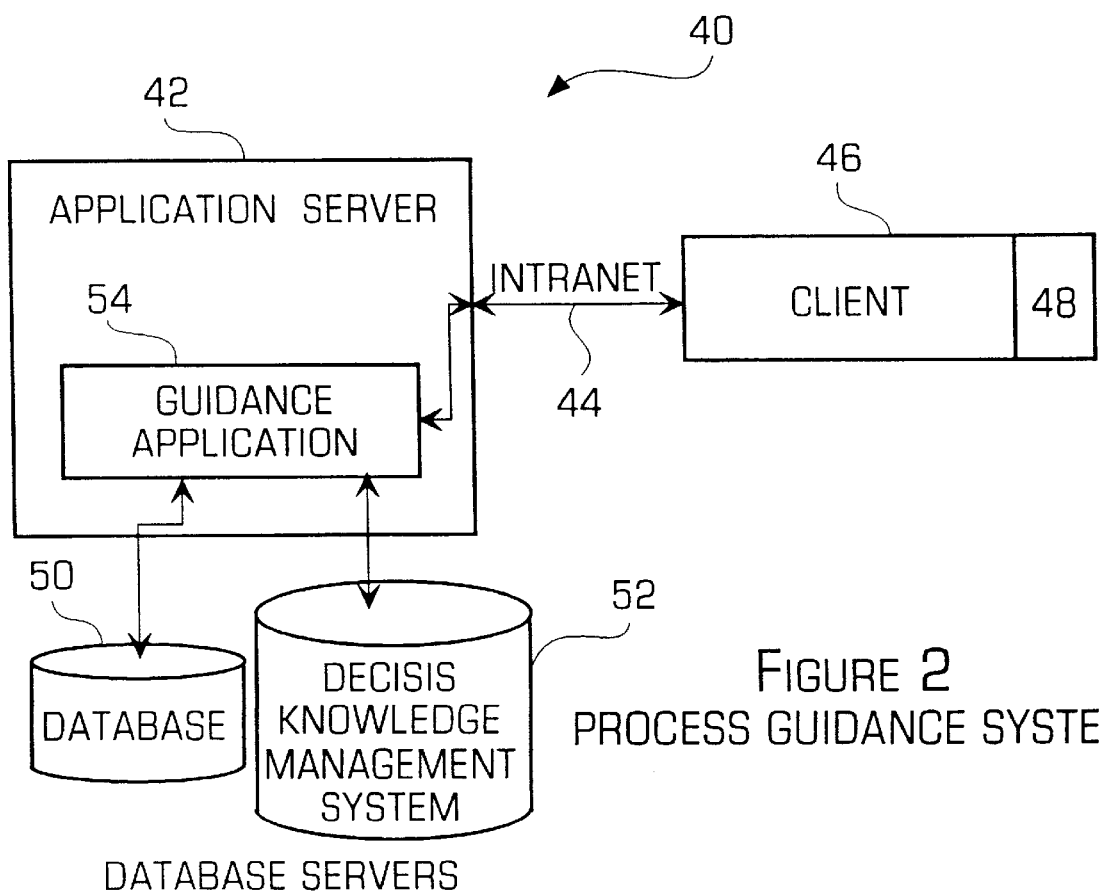
FIG. 2 is a block diagram illustrating a process guidance system in accordance with the invention implemented using a client/server type computer system.

FIG. 2 is a block diagram illustrating an example of a process guidance system 40 in accordance with the invention implemented as a client/server system. It should be understood, however, that the process guidance system in accordance with the invention may be implemented a variety of different computer systems and the invention is not limited to the client/server architecture shown. In this example, the system 40 may include a server computer 42 connected via a computer network 44, such as a corporate Intranet, to one or more client computers 46 (although only one client computer is shown in this example) and one or more database servers 50, 52. The system may service an enterprise, such as a business organization. A processor in the client computer may execute browser software 48 and access a common object request broker in order to access information from the database servers, interact with the application server and exchange objects with the server. The server 42 may be connected to one or more database servers (dB) 50, which store various data associated with the enterprise such as employee records and data, and may also be connected to a Decisis Knowledge Management System (DKMS) 52 which stores the process guidance system and method in accordance with the invention. The DKMS also permits the guidance pages, as described below, to be automatically generated from one or more page fragments having preconditions.

The DKMS 52 may be controlled by a software application 54 being executed by the processor in the application server 42 which interacts with the client computer 46. For example, the software application 54 may generate the user interface windows shown on the browser application 48 and receive input from the user. The software application 54 may also access the process guidance stored in the DKMS 52. Each software application 54 may guide a user through a different process. The process guidance contained in the DKMS 52 may be manually generated after reviewing the process to be modeled.

In particular, the process guidance system of FIG. 2 may include a logical structure, such as a decision tree or a decision matrix as described below, which permits a process to be broken down into a sequence of one or more logically related process steps. The steps may include requesting information from the user of the system, providing guidance pages to the user of the system or recommending an action based on the information supplied by the user of the system and the particular company policy. Each step may be represented as a node of the logical structure. At each step of the process, the node of the logical structure representing that step of the process may include a guidance page, as described below, which permits the user of the process guidance system to receive information about the particular step in the process. For example, the guidance page may provide answers to frequently asked questions, may further define a particular term needed to make the decision, may provide the user with the choices at that particular point in the process or may make recommendations about actions to be taken by the user of the system. The guidance pages may also, where appropriate, recommend or require that the rest of the process be handled by a process expert, such as a human resources manager.

The DKMS 52 may be used to implement guidance for a variety of different processes which are well known to an expert, but for which other employees may require some guidance to navigate through the process. These processes may include human resources type of processes, such as discipline processes, compensation processes, attendance management processes, work absence processes, employee performance coaching, and the interview process for potential new employees. The processes may also include any other process which an employee may be guided through, such as the re-tooling of a manufacturing plant, the safety review of a manufacturing plant and the like.

To guide a user through the process, a logical structure is generated with represents the entire process since each node of the logical structure may represent a single step of the process. The logical structure may be generated based on the steps of the process and the policy behind the process since the policy may determine, for example, the actions to be taken by the user in response to a problem. The logical structure codifies the policy into discrete steps through which a user may be guided. To add information unique to a particular company or situation or customize the guidance system, the guidance system may include the guidance pages.

In operation, the user of the process guidance system (e.g., a manager) may have, for example, a discipline problem with an employee which the manager does not know how to handle. As opposed to bothering the human resources department, the user may log into the process guidance system in accordance with the invention and, in particular, a discipline module within the process guidance system since the process guidance system may guide a user through multiple different processes. Once logged into the process guidance system, the user may be prompted, for example, to enter various information about the problem employee in a series of steps into the system. This information may be transferred back to the server and stored in the database in the employee's record so that the human resources department may later review the record as needed. In addition to gathering information from the user about the employee, the system may begin to guide the user through the discipline process by asking additional questions about the type of discipline problem. Thus, the user of the process guidance system does not need to understand the process nor the policy underlying the process since the logical structure ensures that the policy is being followed. As long as the user enters the requested information, the process guidance system makes the decisions based on the information according to the policy.

A company may have different policies for different conduct problems so that the questions help the process guidance system determine the policy which applies to the particular problem. Once the type of conduct is identified, the process guidance system may ask additional questions to determine the appropriate level of discipline for the particular offense. For example, a first time offender may receive a lighter discipline (a private talk with the manager) than a repeat offender (an official letter to the file or even dismissal). The process guidance system, based on the gathered information about the employee and the policy of the company, eventually may recommend a disciplinary action for the employee (talk with manager, formal reprimand, termination, etc.) and provide the user with instructions for carrying out the discipline. For example, the process guidance system, through the guidance pages, may provide the user with a script for an informal talk with the employee about the problem. For more severe discipline, the process guidance system may direct the user to call human resources and have human resources handle the discipline. In this manner, the complex process of disciplining an employee may be somewhat automated so that even a manager with no knowledge of the company policy nor the discipline process may be able to accomplish a majority of the discipline process. Now, an example of a decision tree that may be used to automate the employee conduct management process and guide the user of the system through that process will be described.

Figure 3:
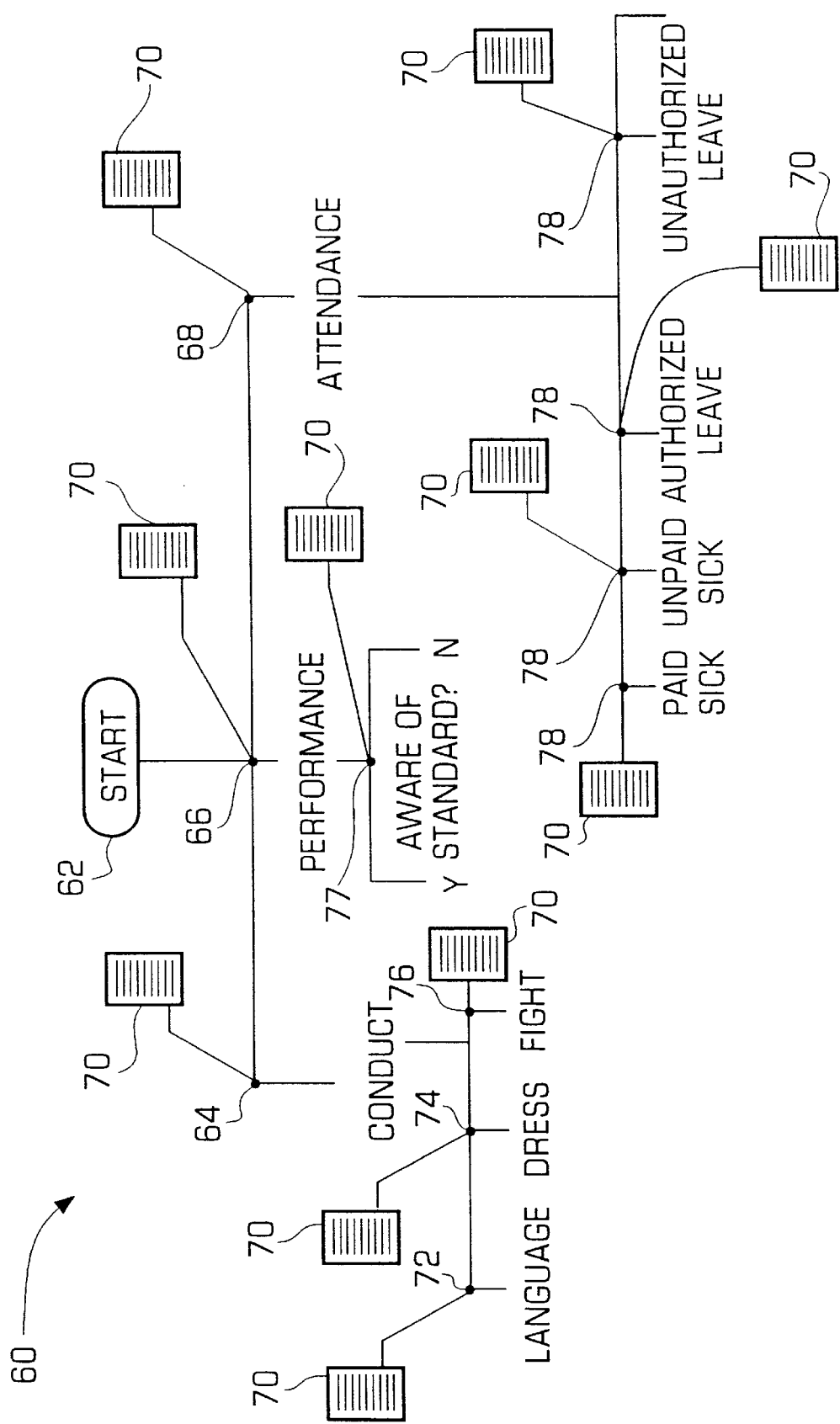
FIG. 3 is an example of a decision tree for an employee conduct management embodiment of the process guidance system of FIG. 2.

FIG. 3 is an example of a decision tree 60 for an employee conduct management embodiment of the process guidance system of FIG. 2. The decision tree is merely one of several logical structures which may be used to model a decision process. Another logical structure is a decision matrix which will be described below. The decision tree logical structure may be used for processes involving many questions which lead to further questions. In this example, the decision tree is illustrated for a employee conduct discipline process. The decision tree may be used by the process guidance system in accordance with the invention to guide an employee through various different processes.

The decision tree shown may include a root node 62 from which the employee conduct management process begins. The first question of the process may be what type of conduct has become a problem. The method may give the user the options of selecting conduct problems, performance problems or attendance problems. The user of the process enters a response, and the process may move from the root node 62 to the appropriate node 64–68 which reflects the selected conduct (i.e., conduct, performance or attendance). As is apparent, the decision tree may also be expanded to cover other types of employee conduct or a separate decision tree may be generated for each different type of conduct. At each of the conduct nodes 64–68, the decision tree may include an associated guidance page 70 which provides the user of the system with additional information about that point in the process and assists the user in selecting the next appropriate node in the decision tree. The guidance page may include, for example, the internal policies of a company about a particular subject or a recommended action. Thus, for policies and other information unique to the particular company, the information may be placed in the guidance pages since the guidance pages may be more easily changed than the logical structure. For example, the guidance page 70 at the conduct node 64 may indicate the definition of conduct which falls under this section of the process and provide some guidance about the laws which are applicable to that conduct. Similarly, the performance and attendance guidance pages may define what types of performance and attendance issues fit within each category. The structure of the guidance pages will be described in more detail below.

Underneath each category node (conduct, performance or attendance), the user of the system is asked additional directed questions to further the process. For example, under the conduct category, the system may ask the user of the system to further specify the type of problem conduct (i.e., language, dress or fighting in this example) and then direct the user to the appropriate sub-node 72–76 of the decision tree. At each sub-node applicable to each type of conduct, each sub-node may also include an associated guidance page 70. In the language node 72, for example, the guidance page may include information about the types of language which are actionable, the policy relating to inappropriate language and suggestions about solutions to the language problem. The solutions to the problem may range from an informal discussion with the employee (if it is a first offense, for example) to a written reprimand to a termination of the employee in severe cases. Similarly, for fighting and dress issues, the guidance pages 70 may provide the laws relating to the topic, the company's policy about the topic and suggestions about appropriate responses to the problem.

Similarly, for the performance node 77, the guidance page 70 may provide the company's policy about expected performance which may be printed out and shown to the employee in the event that the employee does not remember seeing the policy. The guidance page may again instruct the user of the system about how to handle the problem. Similarly, the system may ask the user to specify the type of attendance problem which then falls into one or more attendance sub-nodes 78 (i.e., paid sick, unpaid sick, authorized leave or unauthorized leave) which each may have a guidance page 70 associated with them for further instructing the user about the law, the proper course of action and the company policy at this step in the process. In this manner, a user of the system, with little or no knowledge about the employee conduct discipline process or the company's policy, may be guided through the employee conduct discipline process and given suggestions about how to resolve the problem without involving the human resources department in routine but critical advice.

The guidance pages may display a variety of different pieces of information which range from information that may be used by the user of the system, but is optional, to information that must be used by the user (i.e., call human resources now to help resolve a complex issue) to information that provides the user of the system with a warning about a particularly difficult issue or situation. In general, the more variable portions of a process, such as individual company policies, individual company terms (e.g., one company may use the term "employees" while another company may call them colleagues) or individual company recommendations about issues, may be placed in the guidance pages which may be easily altered. Thus, the guidance system handles a variety of different companies with different policies and other variables by using the guidance pages. Now, the guidance pages will be described in more detail.

Figures 4, 5:
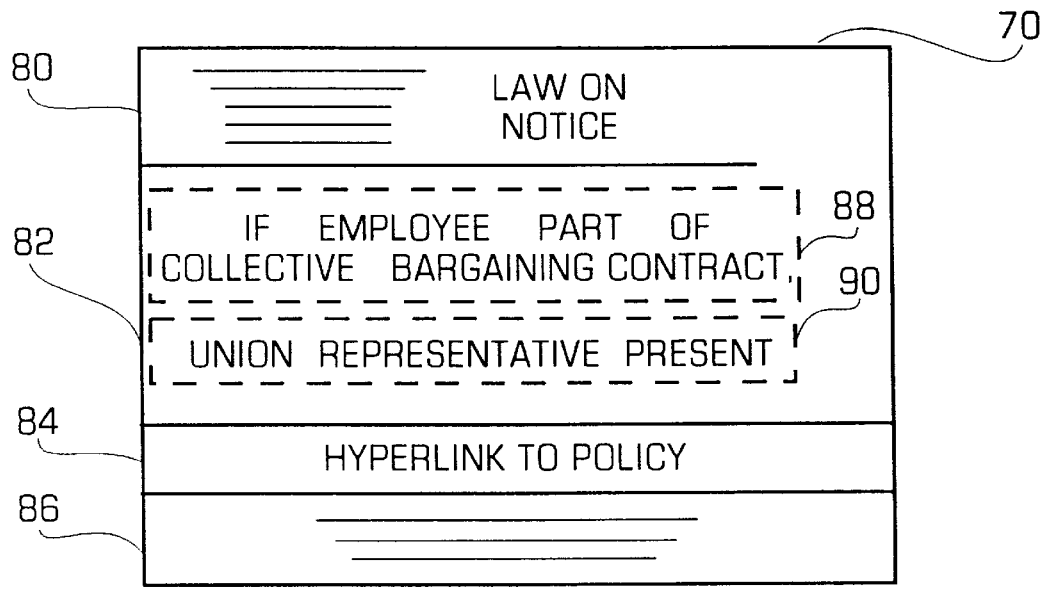
FIG. 4 is a diagram illustrating the structure of a guidance page in accordance with the invention.
FIG. 5 is an example of a decision matrix for an employee leave embodiment of the process guidance system of FIG. 2.

FIG. 4 is a diagram illustrating an example of the structure of a guidance page 70 in accordance with the invention. Each guidance page may include one or more page fragments 80, 82, 84 and 86 which are combined together to make up the guidance page. Each page fragment may have different information and may or may not appear in particular situations based on fragment preconditions which will be described below. In this example, the top page fragment 80 may contain the text of the law relating to giving an employee notice of a disciplinary problem and a hypertext link to the relevant legal interpretation. For this page fragment, there may be a page fragment for each state in the United States and the guidance system automatically determines the state that the company is in and brings up the appropriate page fragment with the appropriate law on notice. To accomplish this selection of the proper state law, each page fragment with the appropriate state law has a fragment precondition (i.e., the company must be in a particular jurisdiction) which must be satisfied otherwise the page fragment is not shown to the user.

In page fragment 82, the page fragment may include a fragment precondition 88 and an action to be taken if the fragment precondition is satisfied 90. In this page fragment, the fragment precondition is that the particular employee must be part of a specific collective bargaining agreement and then the action is that a union representative must be present at any meeting with the employee due to union guidelines. In the event that the employee is not part of a collective bargaining agreement, then the entire page fragment 82 is not shown to the user since it does not apply to the particular situation. In this manner, the guidance pages may automatically alter themselves to particular situations to give the user of the system only the information required to solve the problem.

The fragment preconditions which may be attached to a page fragment may include jurisdictional preconditions (the page fragment is only shown to a user in a particular jurisdiction since it does not apply in other jurisdictions), effective date preconditions (the law or policy with an effective date in a month should not be shown to a user until the effective date passes), a site specific precondition (for a large corporation with different types of jobs, the guidance may change depending on the type of job) and the union precondition described above. The other page fragments 84, 86 in this example may include a hyperlink to the actual text of the company policy (which would be individualized for each company) and additional text further explaining the situation. Using these guidance pages with the page fragments, the guidance system may be easily customized for a particular company, a particular company site or the like so that the logical structure of the system (the decision tree or the decision matrix) may be kept intact during the customization process. Therefore, the universal process steps may be placed within the decision tree (since they are not likely to change) and then the information which is likely to change (i.e., the actual company policy or the disciplinary actions to be taken) may be placed within the guidance pages which may be easily customized using the page fragments and the fragment preconditions to control whether a page fragment is shown to the user. Now, an example of a decision matrix in accordance with the invention will be described.

FIG. 5 is an example of a decision matrix 100 for another embodiment of the process guidance system of FIG. 2, this embodiment being for an employee leave process. The decision matrix is most useful for a process which involves one or more rules which must be resolved and alternatives selected in order to complete the process. For example, a matrix to help a manager determine when employee leave under the Family Medical Leave Act is justified will be described. The Family Medical Leave Act is a good example of a type of process that a matrix can help solve, since decisions are based on one or more rules which may interact with each other.

In this example, there may be Federal law, State law, company policy and a collective bargaining agreement (shown in rows 101 of the matrix) all of which may influence the decision about whether the employee is entitled to paid leave under the Family Medical Leave Act. A number of columns 102 of the matrix list factors which help to answer the question. The columns may contain the most restrictive factors at the left side of the matrix and the least restrictive factors at the right side of the matrix. The matrix is set up in this manner so that if the most restrictive factors eliminate the employee from consideration, the process will terminate without the necessity of considering the other factors. This renders the decision making process more efficient.

In this example, a most restrictive factor is that the employee must have worked more than 1250 hours in order to quality for the leave. If the employee has not worked the required time, the leave cannot be authorized. Note that for each type of law, the factors may apply in different manners or may not apply at all. For example, in the company policy row, the fact that a person who is not a member of the immediate family is sick will indicate to the user of the system that the employee is not entitled to leave under the company policy. In this manner, the system may ask questions to the user about the employee and then, based on the decision matrix, make the appropriate decision for the user without the user having to understand the applicable laws and the like. Thus, similar to the decision tree, the decision matrix guides a user through a process about which the user may have little or no personal knowledge. Similar to the decision tree described above, the decision matrix may also include guidance pages which provide the user with additional information to resolve the problem and complete the process.

Now, the process guidance system in accordance with the invention that may be used to guide a user through a complex multi-step process will be described in more detail. To better understand the invention, several different embodiments of the process guidance system will be described. First, an example of an employee attendance management process will be described. Then, a compensation determination process will be described. As is apparent, the process guidance system in accordance with the invention may be used to guide a user of the system through a wide variety of different complex, multi-step processes which often require the user to make a decision or provide input at each step of the process. Now, the employee attendance management process will be described.

Figure 6:
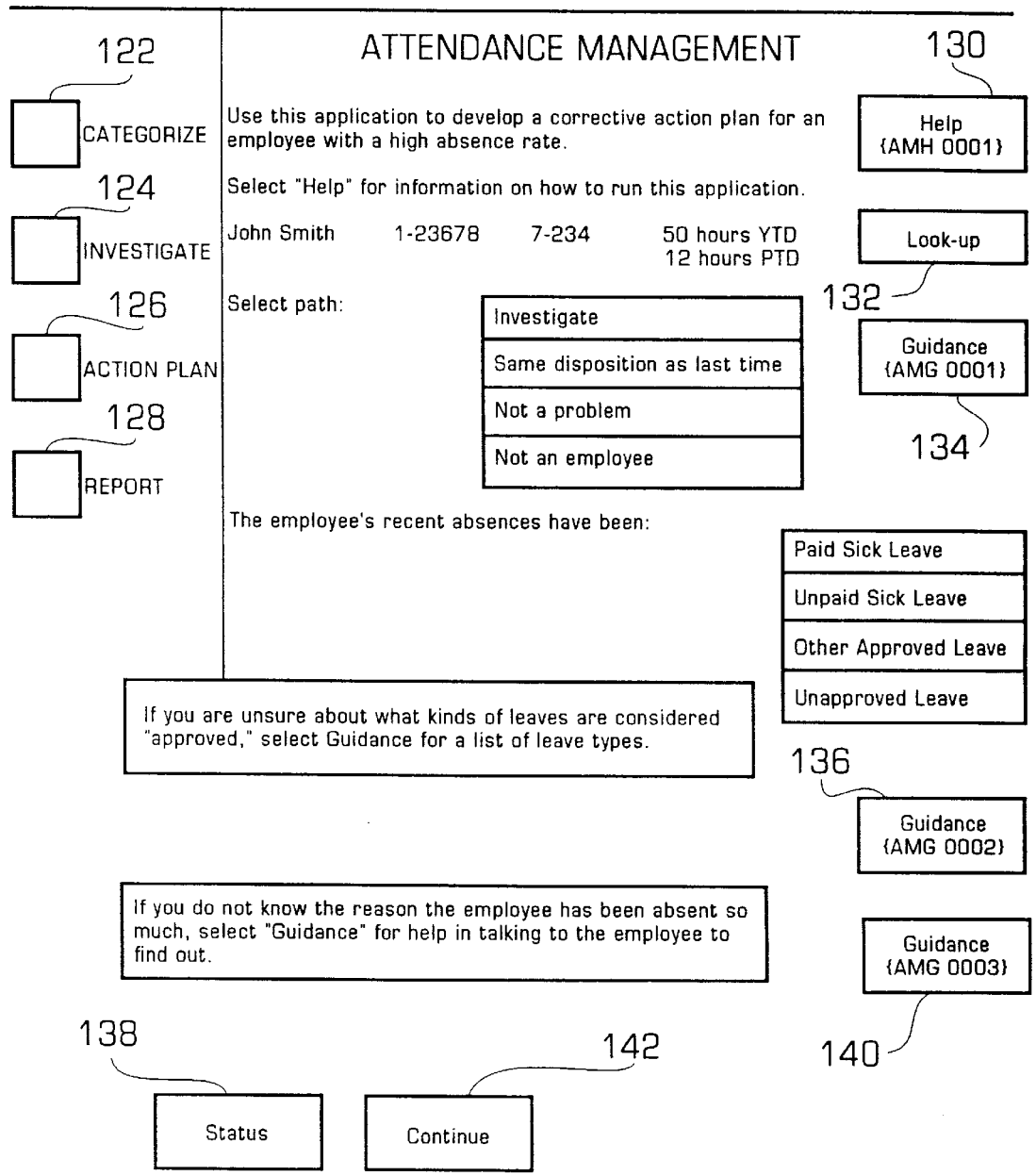
FIG. 6 is a diagram illustrating an attendance management process user interface for a third embodiment of the invention.
Figure 7:
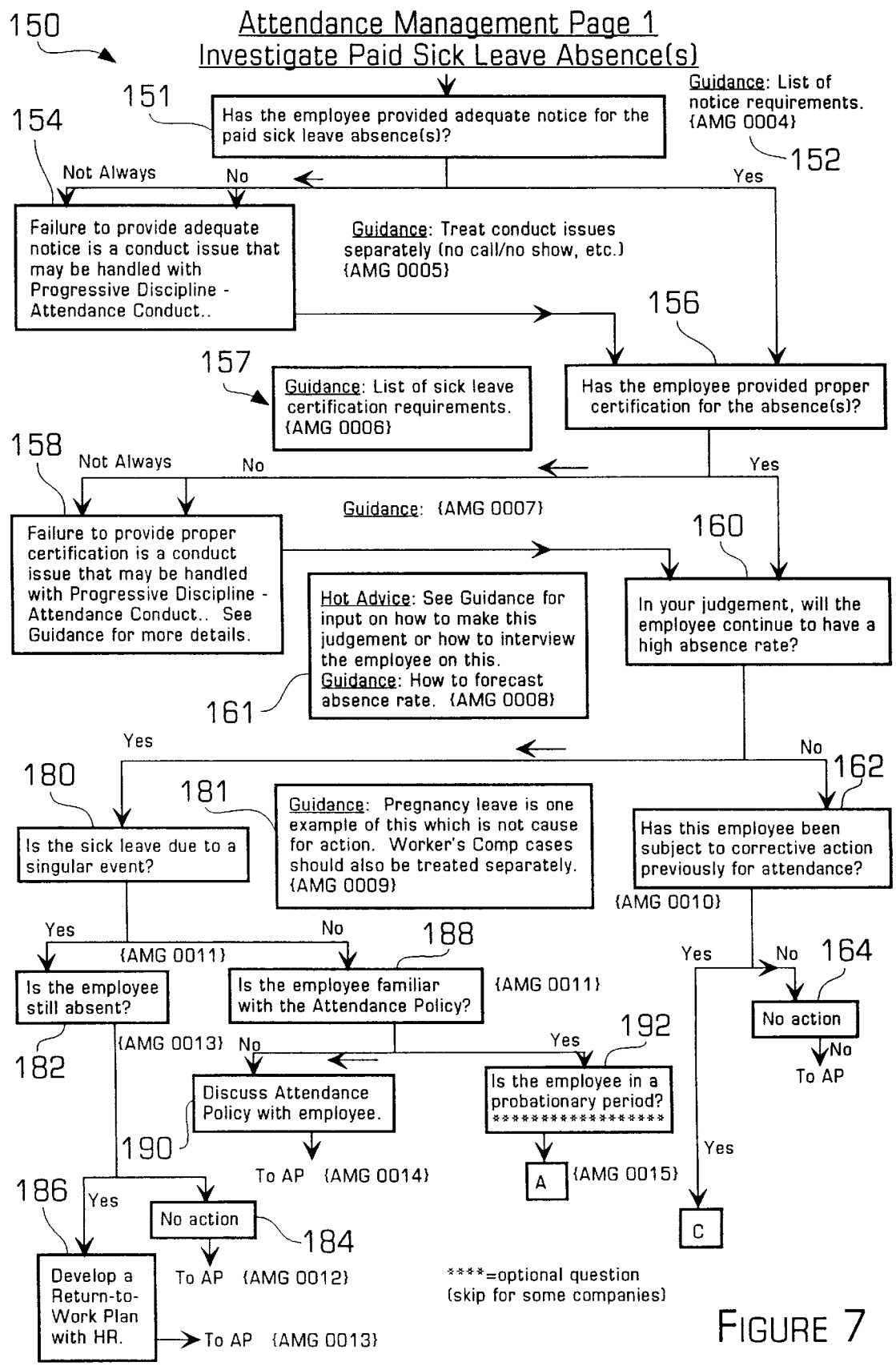
FIGS. 7, 8, 9 and 10 are flowcharts illustrating a process for investigating paid sick leave in accordance with the third embodiment of the invention.

FIG. 6 is a diagram illustrating a user interface 120 for a guidance system in accordance with the invention that may be used for an attendance management process. In this embodiment, an attendance management process which is typically handled by a human resources person is being modeled so that a user of the system is guided through the attendance management process with minimal knowledge about the actual process steps or the policy underlying the process. The subsequent flowcharts in FIGS. 7–10 illustrate the decision tree with its guidance pages to guide a user of the system through an employee absence problem. The guidance process may be initiated either automatically or manually. In the manual mode, the user of the system (who might be a line manager) may enter the guidance system to deal with a specific attendance problem with an employee. In this case, the user may select the appropriate employee and enter some information about the absences. In the automatic mode, the guidance system may be connected to a time and attendance tracking system and the guidance system may periodically (e.g., once a month) extract absence information from the attendance tracking system and perform some statistical analysis of the absence data. Based on the analysis, the guidance system may send an e-mail to managers to show the absence rate within the manager's group and then ask the manager to log into the guidance system to resolve attendance issues for a particular employee.

Returning to FIG. 6, the user interface 120 may include various buttons which may be selected by the user of the system to investigate the attendance problem. In particular, there may be a Categorize button 122 to permit the user of the system to categorize the employee's absence if the category is known, an Investigate button 124 to investigate a particular type of absence as described below, an Action Plan button 126 to generate an action plan as described below with reference to FIG. 20 and a Report button 128 for generating a disposition report as described below with reference to FIG. 21. The user interface may provide the user with a Help button 130 to help the user understand how to use the guidance system. The user interface may also have a Look-Up button 132 so that the user of the guidance system may look up a particular employee's record from a database server.

The user interface may also permit the user to select a path from several options including an investigation of the absence, the same disposition as last time, the absence is not a problem (it is excused for some reason) or the employee being viewed is not the employee of the particular user of the system. There may be a guidance page 134 for explaining the path that should be selected by the user. The user interface may also permit the user, if known, to select the category for the recent absence (e.g., paid sick leave, unpaid sick leave, approved leave or unapproved leave). Each of these different types of absences may be investigated by the user using the guidance system to direct him/her through the investigation. There may also be another guidance page 136 for instructing the user about how to talk with the employee about the recent absence and what questions to ask (a script). The bottom of the user interface page may include a status button 138 which lists the current status of the absence report for a particular employee, another guidance page 140 and a continue button 142 for continuing the investigation for a particular type of absence. Now, the process for investigating a paid sick leave absence using a decision tree along with the guidance system will be described.

FIGS. 7–10 are flowcharts illustrating a process in accordance with the third embodiment of the invention for investigating paid sick leave absences. This embodiment illustrates well how a complex process having options at multiple decision nodes may be streamlined and automated to facilitate the process. The process is shown as a series of flowcharts which represent the decision tree being used to guide the user through the process. In the decision tree, the arrows on the paths of the decision tree may note a default path that may be taken if the user fails to answer a question. If the user does not answer a question which requires an answer, the guidance system may generate an error message. In this example, there are some parts of the process flow directed to a probationary employee which may not exist in some companies so this part of the decision tree may be optional. As above, there are guidance pages at each decision point or node in the decision tree to further answer questions, make recommendations or the like. Unless these guidance pages have a unique function not already mentioned above, the guidance pages will not be described here. In guiding the user through the process, the guidance system may request information from the user about the employee or ask the user to make a judgment call about the employee. These questions to the user of the system may be referred to in the description below as the guidance system determining information about the employee.

The decision tree 150 for investigating paid sick leave first asks the user of the guidance system whether the employee has provided adequate notice for the paid sick leave in step 151 and may pop-up a guidance page 152 which lists the notice requirements for the user of the system. If the user cannot answer that question, the default path is to assume that the employee did not give adequate notice. Therefore if the employee did not give or does not always give adequate notice or the user cannot answer the question, then the system indicates that the failure to provide adequate notice is a conduct issue handled with progressive discipline in step 154 and provides the user with a guidance page indicating that conduct issues should be treated separately. Then, after dealing with the failed notice issue or if the employee has given adequate notice, the system asks the user to determine in step 156 whether the employee has provided proper certification for the absence and provides a guidance page 157 which lists the sick leave certification requirements. If the user determines that the employee has not supplied proper certification or does not know the answer to the question, then the system goes to step 158 in which it indicates that failure to provide proper certification is another conduct issue to be handled through a separate progressive discipline process as above.

Next, if the improper certification issue is resolved or the employee did provide proper certification, the guidance system moves to step 160 in which the system asks the user, in his/her judgment, whether the employee will continue to have a high absence rate. This step may include a guidance page 161 which indicates how to forecast an absence rate and input on how to interview the employee and make the judgment about future absences. If the user judges that the employee will not continue to have a high absence rate, then the system asks the user, in step 162, whether the employee has previously been subject to corrective action for attendance problems. If the user answers no (which is also the default answer), then the system recommends to the user that no action is taken in step 164 and the system moves to the action plan which will be described below with reference to FIG. 20. If the employee has previously been subject to corrective action for an attendance problem, then the system moves to step 166, shown in FIG. 10, in which the system asks the user if the recent attendance of the employee has been satisfactory. If the recent attendance has been satisfactory, then the system recommends positive reinforcement in step 168 as specified in the associated guidance page and goes to the action plan. If the recent attendance has not been satisfactory, then the system asks the user whether the employee has a viable plan to improve attendance. If the employee does not have a plan, the system asks, in step 172, what action was previously taken and suggests, in a guidance page, that the user consider why you believe that the employee's absences will not continue. If the employee does have a viable plan, the system also asks the user what action was previously taken. The prior actions may include an informal discussion (ID), informal counseling (IC), an oral reminder (OR), a written reminder (WR), decision making leave (DML) in which an employee is sent home for a day to think about whether they are committed to the job, job reassignment in which the employee is assigned to a new job, and accommodation in which an employee's disabilities are accommodated in the employee's current job. If there has been a job reassignment and the employee has a plan, the system will recommend no action, but if there has been a job reassignment, but the employee has no plan, the system will recommend an informal discussion in step 174 and proceed to the action plan. If there has been an accommodation and the employee has a plan, no action is recommended, but if there is an accommodation and no employee plan, then an informal discussion is recommended in step 176 and then the process goes to the action plan. In step 178, the system may recommend various actions based on what previous actions have occurred and whether the employee has a plan. For example, the employee is to be terminated if he/she is already on decision making leave and does not have a plan to correct the attendance problem. In this example, a prior action may be escalated to the next discipline level if no employee plan exists. Thus, in this manner, the system may guide the user through the attendance problem process and ultimately recommend an action to be taken which is consistent with the company's policy.

Returning to FIG. 7 and step 160, if the user judges that the employee will continue the high absence rate, then in step 180, the system asks whether the sick leave was caused by a singular event and provide a guidance page 181 indicating that pregnancy leave and worker's compensation are examples of leave which are not actionable. If the absence is due to a single event, then the system asks if the employee is still absent in step 182 and recommends no action if the employee has returned in step 184 and proceeds to the action plan. If the employee is still absent, then the system recommends that a return-to-work plan is developed with HR in step 186 and the process proceeds to the action plan. If the sick leave is not due to a single event, then the system asks if the employee is familiar with the attendance policy in step 188 and recommends discussing the attendance policy with the employee in step 190 if the employee does not know the policy and proceeds to the action plan. If the employee understands the policy, then the system may optionally determine if the employee is in a probationary period in step 192. The next series of process steps relate to determining information about a probationary period for an employee and these steps may be skipped if the company does not have a probationary period.

Figure 8:
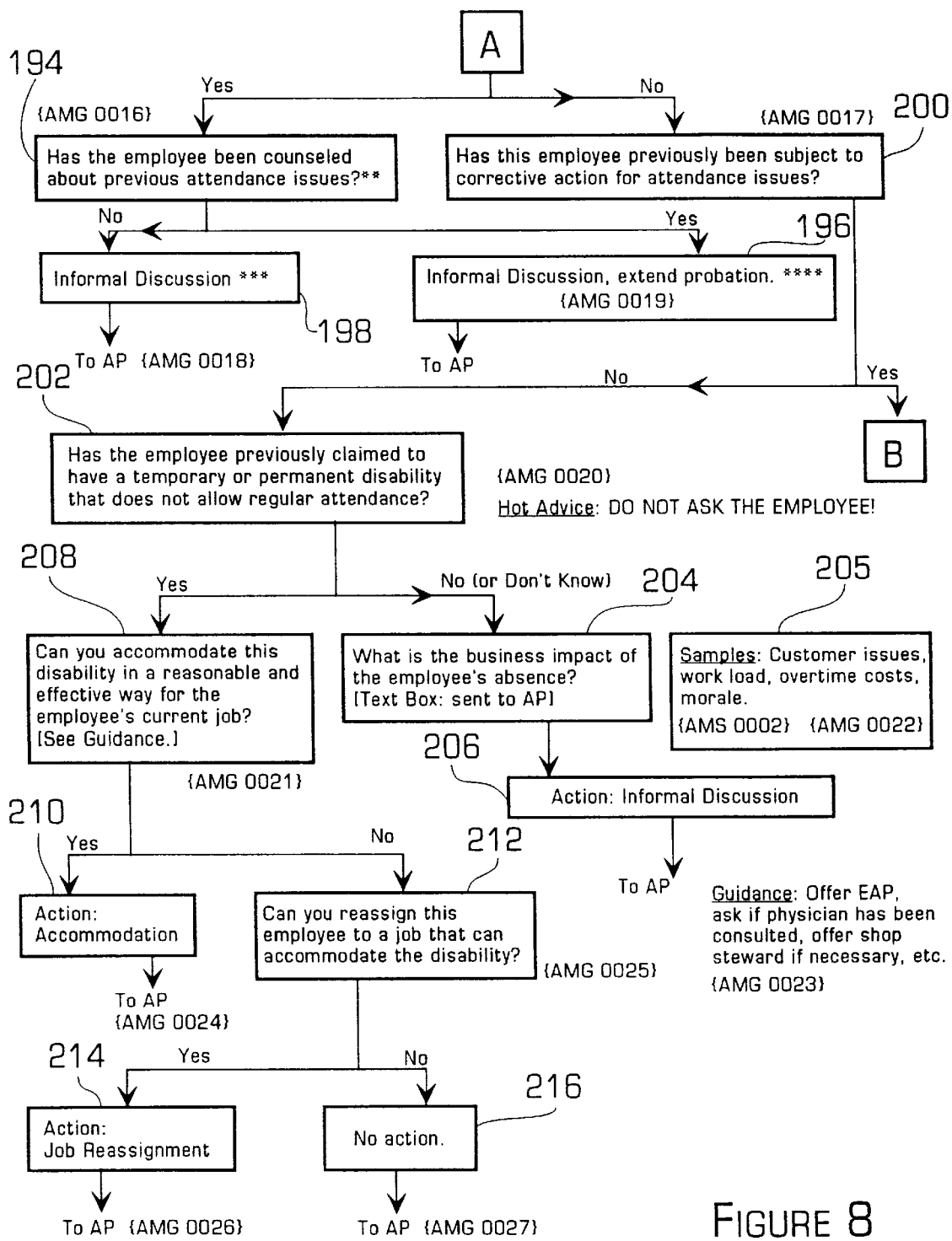
Figure 9:
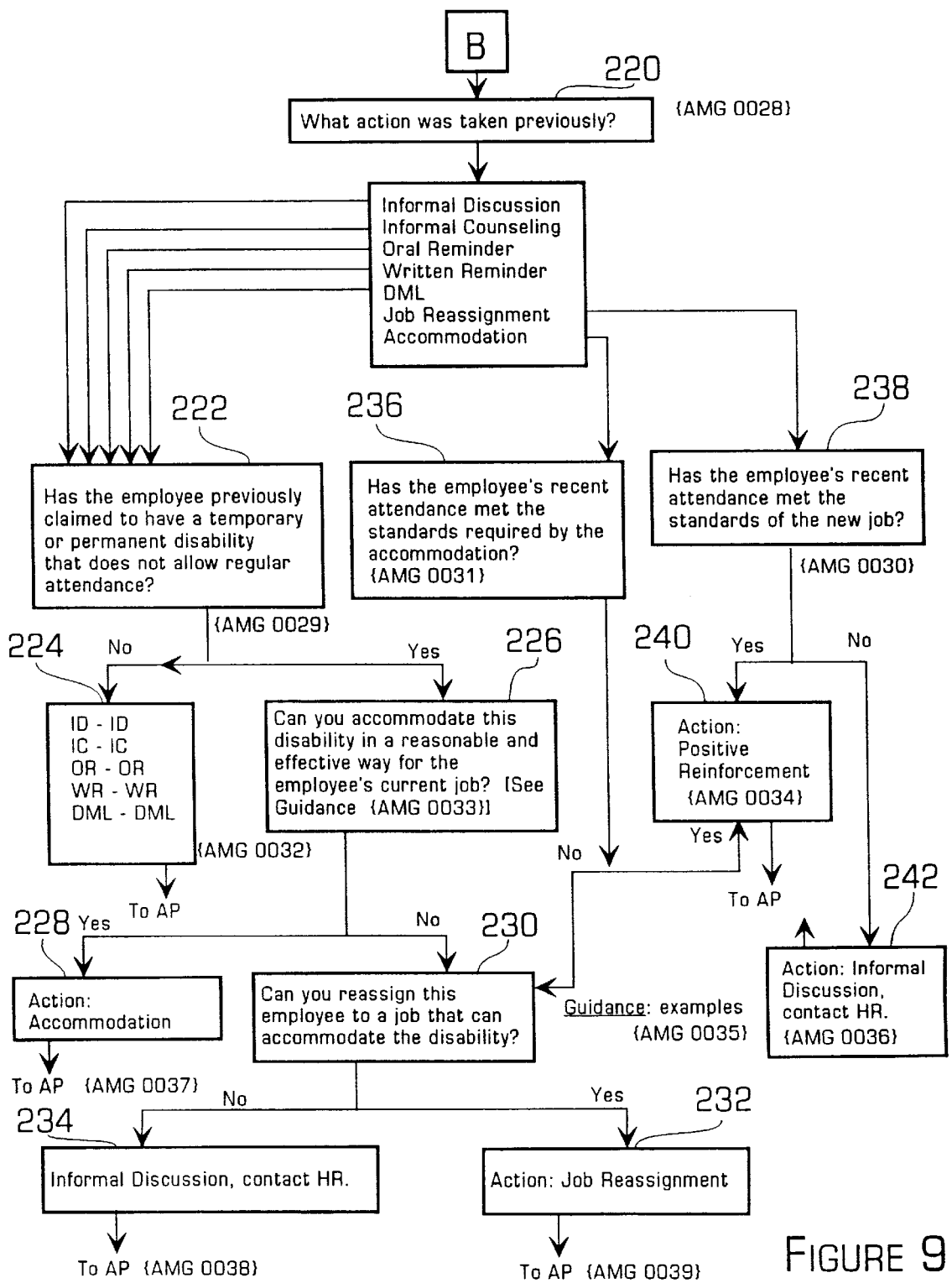
Figure 10:
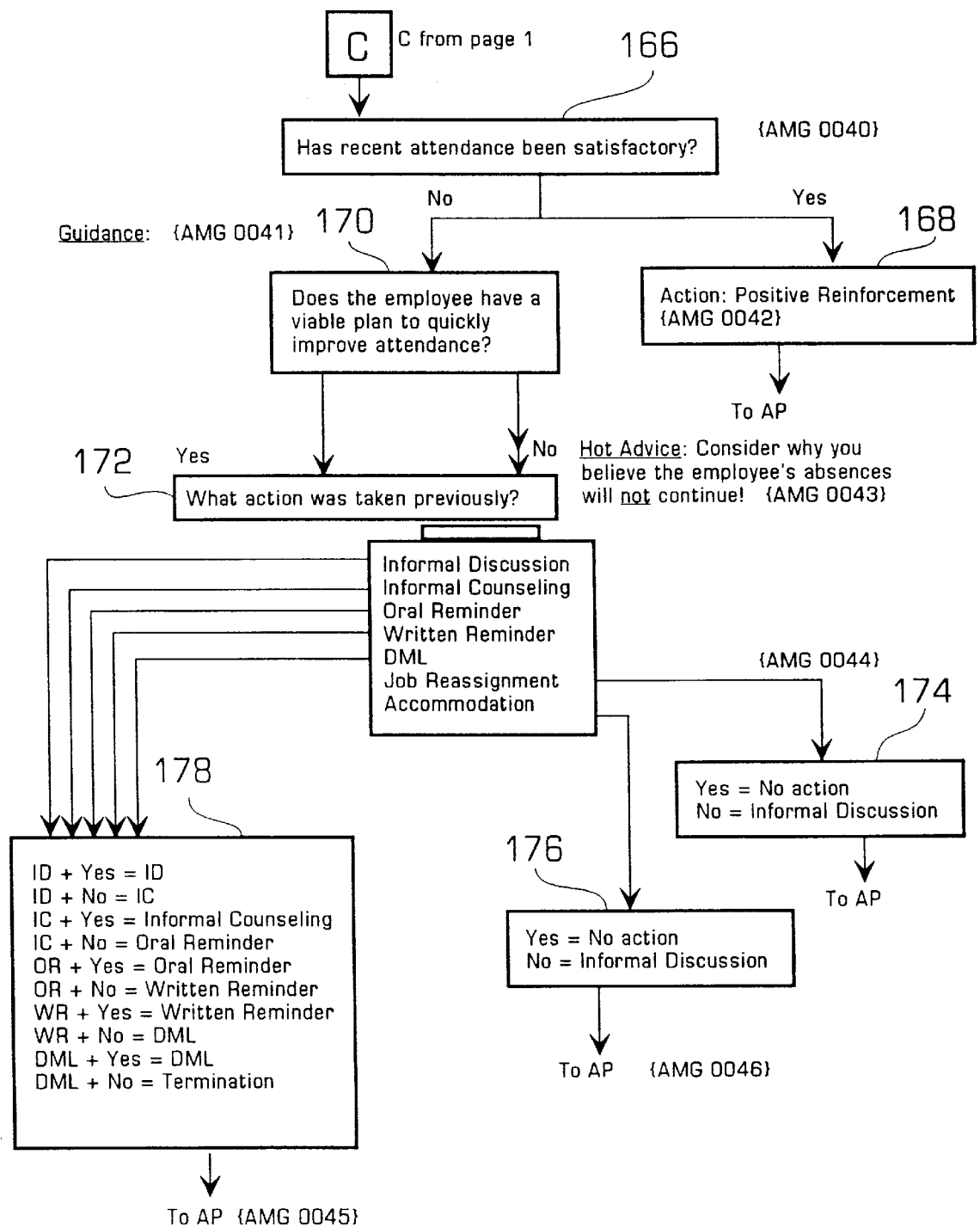

The steps in an exemplary process relating to the probationary period will now be described with reference to FIG. 8. If the employee is in the probationary period, the system asks if the employee has been counseled about previous attendance issues in step 194. If there has been a prior discussion, then the system recommends an informal discussion and to extend the probation in step 196 and proceed to the action plan. If the employee has not been talked to before, the system recommends an informal discussion in step 198 and proceeds to the action plan. If the employee is not within the probationary period, then the system asks if the employee has been previously subject to action for attendance problems in step 200. If the employee has not been previously subject to discipline for attendance problems (which is the default option if the user does not know), then the system asks whether the employee has previously claimed to have a temporary or permanent disability that prevents regular attendance in step 202, but warns the user not to directly ask the employee about the disability. If the user does not know the answer or the answer is no, then the system asks what is the business impact of the employee's absence in step 204 and provides a guidance page 205 with examples of the impact such as customer issues, work load issues, overtime costs, or morale problems. The answer to the question is then incorporated into the action plan and the system recommends an informal discussion in step 206 and proceeds to the action plan. If the employee has previously claimed a disability, then the system asks whether the disability can be accommodated in the current job in step 208 and, if so, the disability is accommodated in step 210. If the disability cannot be accommodated, then the system asks if the employee may be reassigned to a job which can accommodate the disability in step 212. If a reassignment is possible, then the reassignment is recommended in step 214 or no action is taken in step 216 if a reassignment is not possible. Now, returning to the situation in which the employee has previously been subject to corrective action, the process to handle this situation is described with reference to FIG. 9.

First, the system determines the action previously taken in step 220. For a previous informal discussion (ID), informal counseling (IC), oral reminder (OR), written reminder (WR) or decision making leave (DML), the system determines if the employee has previously claimed a disability that does not allow regular attendance in step 222. If there is no disability known, then it is recommended that the prior action is repeated in step 224 and then the process proceeds to the action plan. If there is a disability, the system asks if there is a way to reasonably accommodate the disability in the current job in step 226 (the user may use the guidance page to help with the answer) and the accommodation action is recommended in step 228 if it is a practical solution. If an accommodation cannot occur, the system asks if the employee may be reassigned to another job to accommodate the disability in step 230 and recommends reassigning the employee if possible in step 232. Otherwise, an informal discussion is recommended and HR is contacted in step 234.

Returning to the other prior disciplinary actions, if the prior action is an accommodation, the system asks if the recent attendance meets the standards required by the accommodation in step 236 and may recommend reassigning the employee in step 230 if the attendance standards are not being met. If the attendance standards are being met, positive reinforcement may be given to the employee in step 240. If the prior action was to reassign the employee, the system asks if the employee's recent attendance meets the standards of the new job in step 238 and recommends positive reinforcement in step 240 if the attendance standards are being met. If the attendance standards are not being met, then the system recommends an informal discussion and contacting HR in step 242. Thus, using the guidance system and the decision tree, a manager may be guided through the complex process of investigating paid leave absences. The processes for handling and investigating unpaid sick leave absences, approved leave absences and unapproved leave absences may also be handled in a similar manner using a decision tree with guidance pages. Now, an action plan which may be generated by the guidance system in accordance with the invention will be described.

FIG. 11 is a flowchart illustrating an attendance management action plan 550 generated by the guidance system in accordance with the invention. The action plan may be generated each time, in FIGS. 7–19, that an AP is shown in the flowcharts. First, the system displays the current disposition (action to be taken) for the employee and asks the user of the system if an override is appropriate in step 552. A guidance page may provide some guidance about evaluating the action plan and possibly overriding the plan. If the user selects to override the action plan, the system requests information about how the user wants to change the action plan in step 554. After the changes have been entered or if the user accepts the originally generated action plan, the user selects continue to review the disposition report and the disposition report is saved locally on the user's machine in step 556. Then, the system checks if there are more employees with attendance problems that this user is responsible for and begins again at the user interface screen shown in FIG. 6 in step 558. Now, several disposition reports which may be generated by the guidance system in accordance with the invention will be described.

FIG. 12 is a diagram illustrating several examples of disposition reports 600 generated for several employees. As shown, there may be a separate disposition report for each employee who is reviewed by the user of the system. In this example, the user reviewed Jane Doe, Fred Klutz and John Smith and a disposition report (602, 604, 606) was generated for each employee. In the disposition report for Jane Doe, it lists the employee name and identification number and the organization within the company which employs Ms. Doe for identification purposes. The disposition report may also list the current absence totals for the employee and any action/disposition to be taken based on the absences. For example, for Jane Doe, she has 240 hours of absences which the user of the system has resolved and no action has been recommended for Ms. Doe. For example, the absences may have been due to a single major illness. In the case of Mr. Klutz, the user of the system notes that Mr. Klutz is not his employee so that HR should find the appropriate manager to deal with Mr. Klutz's attendance problems. With Mr. Smith, the disposition includes the various pieces of information gathered by the guidance system based on the user's responses to the questions along with the disposition that the user has overridden the guidance system and is not going to take any action at this time. Thus, based on the information gathered by the guidance system from the user, a disposition report is generated for the user, optionally sent via e-mail to the manager's manager, and also stored in the file of the employee so that an HR person can review the disposition reports periodically. The guidance system permits a large portion of the attendance process to be handled by the user using the guidance system even when the user of the guidance system does not intimately know the company's policy and practices about attendance. Thus, even without knowledge of the policy behind the process or the actions recommended by the policy, a manager of an employee can be guided through the process by the guidance system to achieve an action plan for resolving the attendance problems in accordance with the company's policy on attendance. Now, a compensation determination process which uses the process guidance system in accordance with the invention will be described.

Figure 13:
FIG. 13 is a diagram illustrating a compensation process user interface in accordance with a fourth embodiment of the invention.

FIG. 13 is a diagram illustrating a compensation process user interface 650 for a fourth embodiment of the invention. In particular, the process guidance system may guide a manager through the employee compensation determination process. As above, the manager using the process guidance system does not need to know or understand the compensation policy, the rules or guidelines involved with compensation or the complex compensation process in order to determine appropriate compensation for the employee. In the example shown, the user interface 650 may be a web page being displayed on a browser application in a client/server type of computer system. The user interface may permit the user to access the compensation process including, for example, planning the compensation for an employee, reviewing and approving the compensation plans for employees (if the user is a supervisory manager), running reports about the compensation of the employees, accessing collateral material using guidance pages and the like and viewing frequently asked questions and messages from HR using the guidance pages. The user may also view a summary of the employees whose compensation plans need to be determined and the compensation plans in which each employee may participate based on some guidelines which may be unknown to the user of the process guidance system.

In accordance with the invention, the process guidance system may guide the user step-by-step through the compensation process based on the company's policies and rules relating to compensation. At each step of the compensation process, the user of the system is provided with the information, analytics and advice (from the guidance pages) necessary to make a particular decision in a manner which is consistent with the guidelines, rules and policies of the company. To accomplish the compensation planning, users of the system may be provided with one or more separate screens or pages, such as a performance rating page, a compensation planning page and a review compensation page, each of which will be described below. An example of the employee rating page is shown in FIG. 14 and will now be described.

FIG. 14 is a diagram illustrating a page 660 of the compensation process showing employee ratings. The page 660 may include an upper portion 662 and a lower portion 664. The upper portion 662 may allow the user to enter compensation decisions while the lower portion 664 may permit the user to view analytics and supporting data which may help the user to make the compensation decision. A bottom portion 666 of the page may display budget information such as the total budget available for the particular compensation package, the total actually allocated by the user for the particular compensation package and the different between the two totals.

In the page 660, the user may focus on the task of assigning performance ratings to his/her employees. Thus, the upper portion 662 of the page may include a list of the employees for which the user is responsible, their current performance ratings and a column which permits the user to enter new performance ratings for each employee. This page is only used for compensation plans which base the compensation on performance ratings. The bottom portion 664 of the page in this example, may show two pie charts illustrating the current distribution of the performance ratings and the recommended performance ratings. Now, several pages for determining individual employee compensation will be described.

Figure 15:
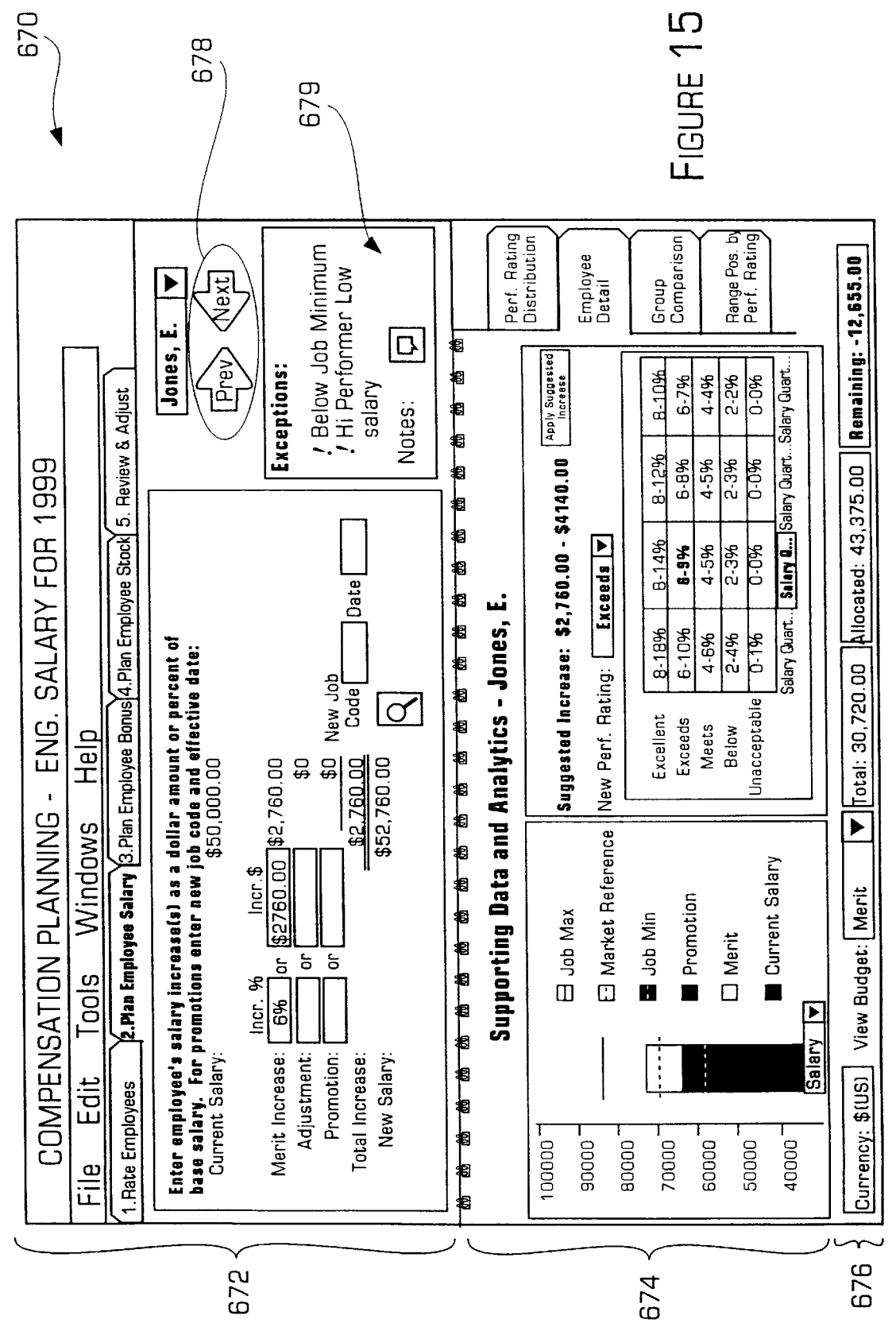

FIGS. 15–17 illustrate examples of several pages which may be used to guide the user of the system through the compensation determination process. In particular, FIG. 15 is a diagram illustrating a page 670 for planning the salary of an employee during the compensation process, FIG. 16 is a diagram illustrating a page 680 for planning variable pay for an employee during the compensation process and FIG. 17 is a diagram illustrating a page 690 for planning stock grants for an employee during the compensation process. Each of these pages 670, 680 and 690 focuses the user of the system on the compensation planning for an individual employee. As above, each page 670, 680 and 690 may include an upper portion 672, a lower portion 674 and a bottom portion 676. The upper portion may permit the user to enter compensation decisions for the particular employee, the lower portion displays supporting data for the compensation decision and the bottom portion displays the budget information as above.

For each employee, using these pages 670, 680 and 690, the user of the system may enter a recommended salary, stock or incentive (variable pay) compensation increases. For example. the upper portion 672 of page 670 permits the user to view the current salary of the employee and recommend a salary increase. The upper portion may also display buttons 678 for moving between the employees and an exception section 679 listing exception for the particular employee. The exceptions may also be known as alerts and may indicate to the user problems with the current compensation plan for a group of employees or for an individual employee. The lower portion 674 of page 670 may display a graph showing the employee's salary against a job minimum, a market salary and a maximum job salary as well as a chart illustrating the recommended salary increase based on the performance rating.

Figure 18A:
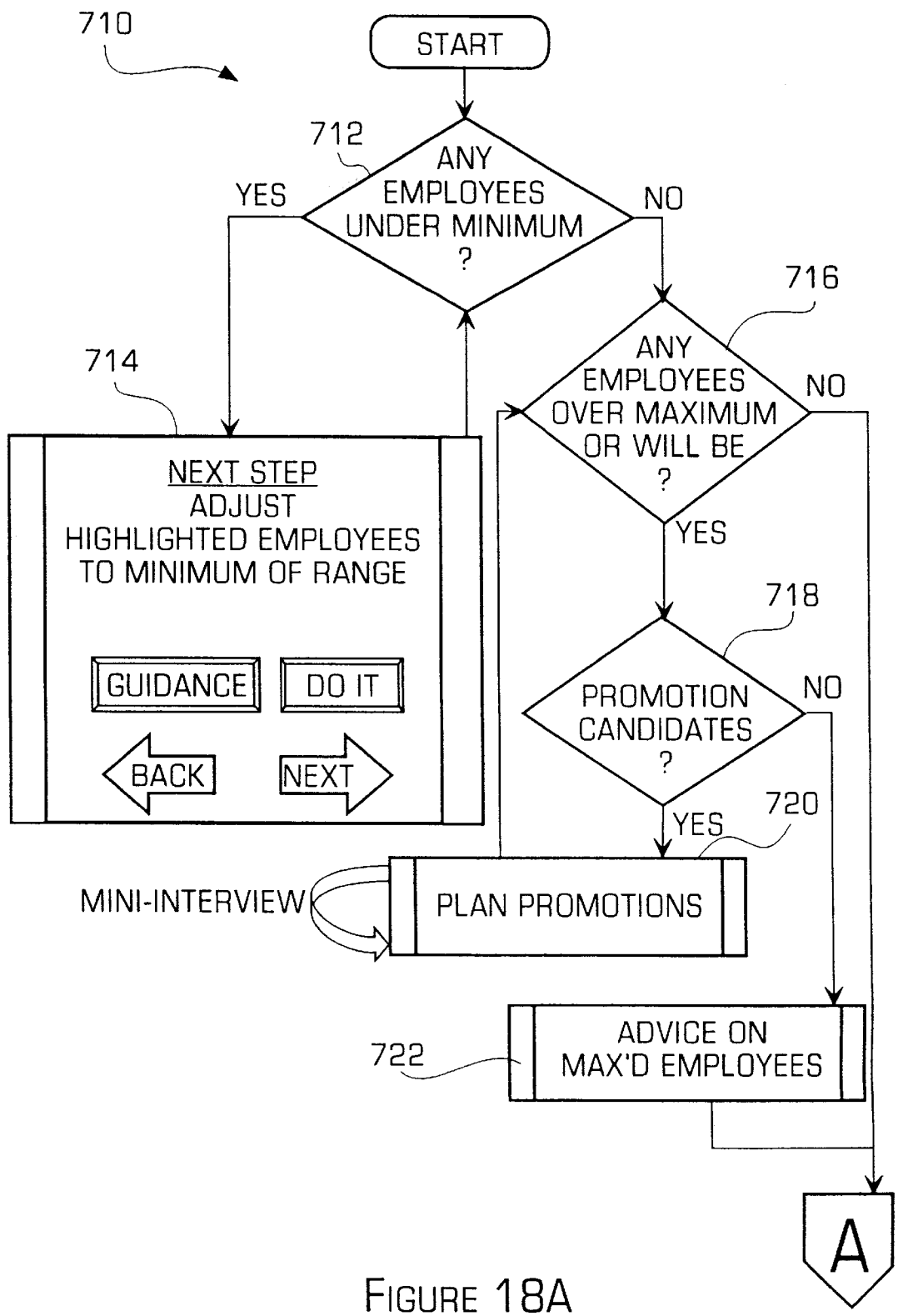
FIGS. 18a and 18b are diagrams illustrating the salary adjustment process in accordance with the invention.
Figure 18B:
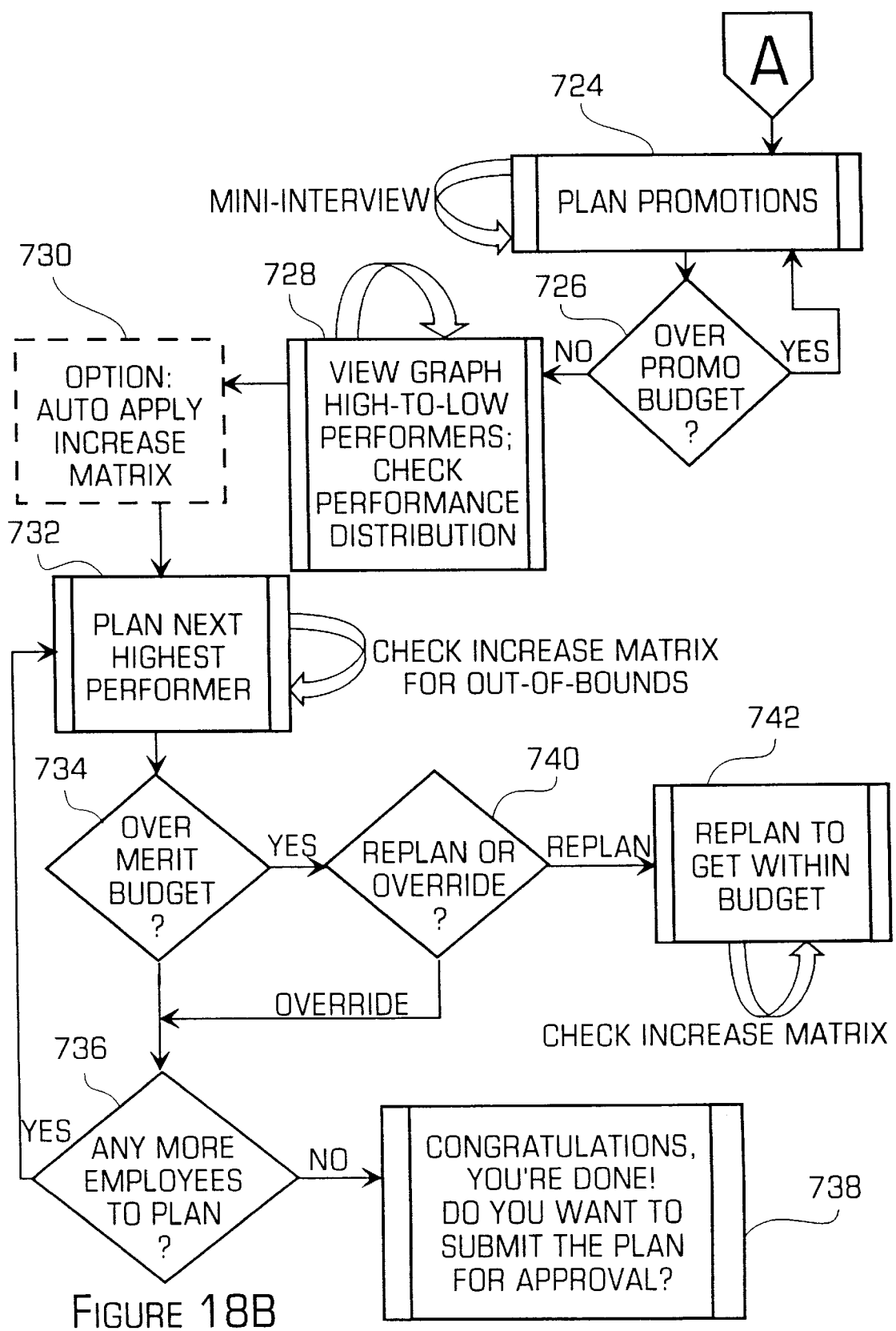

Similarly, the upper portions 672 of the other pages 680, 690 permit the user to enter variable pay (bonus) and stock grant compensation changes for an employee. Each of these pages also include the buttons 678 for moving between different employees and an exception section 679 listing exceptions for the employee. For example, the exception sections 679 in these pages 680, 690 both list that the recommended bonus and grant exceed the guidelines. For example, for the bonus increase, the lower portion 674 recommends a 10–20% bonus based on the employee's salary level, but the user has recommended a 25% bonus. Similarly, the user has recommended an 850 share stock grant while the recommended grant is 700–800 shares. As above, the lower portions 674 of these pages 680, 690 display supporting data, such as a chart illustrating the current employee's bonus or grant against job minimum and job maximum as well as recommended bonus or stock grants based on the employee's salary level. In this manner the user of the system may set the employee's compensation package, including salary, bonus and stock grants. The user's settings of the compensation may then be reviewed by a supervisory manager. A page in the compensation system may also be included for reviewing and adjusting the compensation for a group of employees. Now, the underlying method for determining the salary compensation of an employee will be described, FIGS. 18a and 18b are diagrams illustrating a salary planning process 710 in accordance with the invention which is part of the compensation process. The steps of the salary planning process may be laid out into a logical flowchart. At various steps in the salary planning process, a guidance page may be associated with the step in order to provide the user with knowledge about the company's guidelines or policies, advice about a decision or provide a recommendation about an appropriate salary planning decision. An example of a guidance page in the salary planning process will be described below with reference to FIG. 19.

The salary planning process 710 begins when the system asks the user if any of his/her employees are under the minimum salary for the particular job in step 712. If there are employees under the minimum salary, the system recommends a next step 714 for adjusting the employee's salary to make the salary above the minimum salary. At this step, the user of the system may decide to perform the adjustment, access a guidance page for further information about the decision, move to the prior employee below the minimum salary or move to the next employee that is below the minimum salary. Each option may be accessed by selecting a button on a user interface. Once all of the employees below the minimum salary have their salaries adjusted or there are not any employees below the minimum salary, the system asks the user if there are any employees who are over the maximum salary or will be over the maximum salary after the recommended compensation changes in step 716. If there are employees who are or will be over the maximum salary, the system asks the user if the employees are promotion candidates in step 718 and recommends promoting the employee in step 720 following a mini-interview. If the employee is not a promotion candidate, the system may provide the user, in a guidance page, with advice about how to handle a maximum salary employee in step 722. The system may suggest, for example, increasing the employee's bonus, if possible, or talking with the employee about the salary problem. The system may also provide a script, in a guidance page, for instructing the manager on how to speak with the employee about a maximum salary problem.

Next, in step 724, as shown in FIG. 18b, the system may permit the user to perform salary planning promotions for each employee. In step 726, the system determines if the user is over the promotion budget and returns the user to the plan promotion step 724 to redo the promotions if the user is over the promotion budget. If the user is not over the promotion budget, the system displays a graph showing the high and low performers and a chart for checking the performance distribution of the employees in step 728. During this step, a performance distribution interview may be performed. Next, an optional step 730 may be performed in which the system may automatically apply an increase matrix to each employee. Next, in step 732, the salary planning for a next highest performer may be determined. During the salary planning, the merit increase may be checked against the increase matrix to determine if the increase is outside the guidelines. The system may then determine if the compensation exceeds the merit budget in step 734. If the total of all planned merit increases so far does not exceed the merit budget, the system determines if there are any more employees who need compensation planning in step 736 and returns to step 732 to continue the salary planning process. If there are no more employees for which salary needs to be planned, the salary planning process is completed and the system asks the user if he/she wants to submit the salary plan for approval in step 738.

Returning to step 734, if the new salary is over the merit budget, the user is asked to replan the salary or override the guidelines in step 740. The user may access a guidance page at this step to determine whether to override the guidelines or replan the salary. If the user overrides the guidelines, the process goes to step 736. If the user decides to replan the salary, the user replans the salary to get within the budget in step 742. The system may check the salary change against the increase matrix. Once the replanning has been completed, the process loops back to step 734 to check if the salary is over the merit budget. In this manner, the manager may set an employee's salary without knowing the underlying guidelines and policies relating to an employee's salary. Now, a guidance page in the salary planning process will be described.

FIG. 19 is a diagram illustrating an example of a guidance page 750 for the salary planning process described above. The guidance page 750, in this example, may provide guidance about how to stack rank the employees. The guidance page may provide text explaining the process step (i.e., stack ranking of employees in different pay ranges) as well as an example of how the process step should be completed. Thus, the guidance pages may provide a variety of different information and guidance to the user of the process guidance system.

The compensation determining process may also include group and individual alerts which may appear on the pages described above as exceptions. The individual and group alerts may have a guidance page associated with them to provide the user with guidance about how to resolve the problems identified by the alerts as shown in FIG. 20. The group alerts may be triggered to be displayed to a user by a precondition which is satisfied by the current compensation plan of the user. For example, a group alert may indicate that the variable pay plan is missing from the group, the variable pay plan exceeds the budget, the compensation plan is incomplete, the compensation plan is over budget or the compensation plan is outside of the guidelines of the company. These group alerts alert the user of the system to a problem with the group of employees or the overall compensation plan.

FIG. 20 is an example of an "Active Advice" alert guidance page 800 for an individual employee. The DKMS shown in FIG. 2, assembles the guidance page from one or more page fragments as described above depending on the specific alert condition(s) for the employee. As above, the page fragments are selected if the page fragment condition is satisfied. The individual alert guidance page 800 for the employee provide a region 802 listing the problems with the compensation plan for the individual employee, such as a merit increase over the guideline, a salary above a range position, a salary above a job's maximum salary or an increase matrix guideline that would put the employee's salary above the job maximum. Several of these alerts are shown in FIG. 20. Beneath the listing of the alerts on the guidance page 800 is a section 804 containing advice about how to handle each particular alert. In the example shown, advice about how to handle a merit increase over the increase matrix guidelines is provided. On guidance page 800, the system sets out good reasons why exceeding the increase matrix guidelines may be acceptable. The guidance page 800 may also include a menu 806 which permits the user of the system to access, for example, a database of frequently asked questions, a database of reference material about the salary compensation process or to return to the compensation planning application.

Each of the alerts listed on the alert guidance page requires the user of the system to make a decision about the compensation for the employee which may include overriding the guidelines for a good reason or some other change. For example, for a salary which is over the maximum salary, the guidance page may provide the user with several different options including overriding the guideline, promoting the employee to a new job with a higher salary, providing the employee with a lump sum award, increasing the variable pay, or increasing the stock grant amount.

In accordance with the invention, the logical structure may be applied to a variety of different processes with unique attributes since the logical structure merely represents the flow of the process. The tags on each node of the logical structure and the guidance pages may be changed in order to customize the logical structure for a particular process and/or for a particular company. For example, the same logical structure may be used to handle a number of different unique processes for a particular company, such as a failure to secure a vehicle for UPS, a backing accident or curbing problem for PG&E and the like.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A computer-implemented method for guiding a user through a complex process having a plurality of steps at each of which the user is required to make a decision, the method comprising:

guiding the user through the process using a logical structure for representing the steps of the process, each node of the structure representing a step in the process and one or more of the steps presenting alternatives to the user requiring the user to make a decision;

displaying guidance about a decision in the process using one or more guidance pages attached to a node of the structure;

gathering the user responses to each step in the process to generate process information; and using knowledge recommending an action to the user based on the process information, the logical structure and the guidance pages.

2. The method of claim 1 further comprising generating the guidance page from one or more page fragments which include fragment data and a fragment precondition, a page fragment being shown to the user of the system only if the fragment precondition is met.

3. A computer implemented system for guiding a user through a complex process having a plurality of steps at each of which the user is required to make a decision, the system comprising:

a first computer having a guidance module for guiding a user through a complex process having a plurality of steps;

a database connected to the first computer for providing data to the guidance module, the database storing a logical structure representing the steps of the process wherein each node of the structure represents a step in the process and one or more of the steps presenting alternatives to the user requiring the user to make a decision, one or more guidance pages attached to each node of the structure, the guidance pages providing the user of the system with guidance about how to make decision at the current step of the process;

a second computer being connected to the first computer over a computer network, the second computer further comprising means for displaying a user interface generated by the guidance module, means for gathering user responses to each step in the process to generate process information, and knowledge means for recommending an action to the user based on the process information, the logical structure and the guidance pages.

4. The system of claim 3, wherein each guidance page further comprises one or more page fragments which include fragment data and a fragment precondition, a page fragment being shown to the user of the system only if the fragment precondition is met.

5. The system of claim 4, wherein the process comprises a human resources process.

6. The system of claim 5, wherein the process comprises an attendance management process.

7. The system of claim 5, wherein the process comprises a compensation planning process.

8. The system of claim 3, wherein the structure comprises a decision tree having one or more nodes which represent each step of the process.

9. The system of claim 3, wherein the structure comprises a decision matrix.

10. The system of claim 3, wherein the first computer further comprises a server computer and the second computer comprises a client computer, wherein the client computer further comprises a browser application for permitting the user of the client computer to interact with the guidance module of the server computer.

* * * * *